(12) United States Patent
Smith

(10) Patent No.: US 11,084,348 B2
(45) Date of Patent: Aug. 10, 2021

(54) CLAMP, MOUNT TAB AND TETHER FOR LIMIT STRAP

(71) Applicant: Justin Smith, Wittman, AZ (US)

(72) Inventor: Justin Smith, Wittman, AZ (US)

(73) Assignee: J & J Holdings and Investments, LLC, Phoenix, AZ (US)

( * ) Notice: Subject to any disclaimer, the term of this patent is extended or adjusted under 35 U.S.C. 154(b) by 0 days.

(21) Appl. No.: 16/289,411

(22) Filed: Feb. 28, 2019

(65) Prior Publication Data

US 2019/0263208 A1 Aug. 29, 2019

Related U.S. Application Data

(60) Provisional application No. 62/718,983, filed on Aug. 16, 2018, provisional application No. 62/702,259, filed on Jul. 23, 2018, provisional application No. 62/636,582, filed on Feb. 28, 2018.

(51) Int. Cl.
  *B60G 7/04* (2006.01)
  *F16M 13/02* (2006.01)

(52) U.S. Cl.
  CPC .............. *B60G 7/04* (2013.01); *F16M 13/02* (2013.01); *B60G 2204/4504* (2013.01)

(58) Field of Classification Search
  CPC ............. B60G 7/04; B60G 2204/4504; B60G 2202/312; B60G 15/063; F16M 13/02
  See application file for complete search history.

(56) References Cited

U.S. PATENT DOCUMENTS

| | | | | | |
|---|---|---|---|---|---|
| 1,377,613 | A | * | 5/1921 | Blackledge | F16F 7/06 267/197 |
| 1,477,299 | A | * | 12/1923 | Tverdahl | F16F 7/06 267/198 |
| 1,564,869 | A | * | 12/1925 | Lovejoy | B60G 13/005 267/197 |
| 2,178,332 | A | * | 10/1939 | Beurdeley | B60G 11/22 267/258 |
| 4,235,300 | A | * | 11/1980 | Capjon | B60G 9/00 180/254 |
| 4,610,458 | A | * | 9/1986 | Garnham | B60D 1/485 224/516 |
| 5,170,973 | A | * | 12/1992 | Ohta | B60G 13/006 248/230.2 |
| 5,171,036 | A | * | 12/1992 | Ross | B60G 7/04 280/124.116 |

(Continued)

FOREIGN PATENT DOCUMENTS

EP  2821264 A1 * 1/2015 .............. B60G 9/00

*Primary Examiner* — Darlene P Condra
(74) *Attorney, Agent, or Firm* — Schmeiser, Olsen & Watts LLP

(57) ABSTRACT

A two-piece limit strap clamp for use with a shock absorber and a limit strap retention device is provided. The pieces couple together around the upper end of a shock absorber. The clamp has a protrusion that extends outwardly and is adapted for attachment of the top end of a limit strap. The lower end of the limit strap may be attached to a mounting tab that is coupled to the lower mounting bracket of the shock absorber. Also disclosed is a limit strap with a tether coupled to a spring of the shock absorber to prevent the limit strap from bowing out when the shock absorber is compressed. A method of use of a limit strap with a tether is also disclosed.

7 Claims, 10 Drawing Sheets

(56) References Cited

U.S. PATENT DOCUMENTS

| | | | | |
|---|---|---|---|---|
| 5,881,834 A * | 3/1999 | Karpik | ................... | B62M 27/02 |
| | | | | 180/190 |
| 6,478,098 B2 * | 11/2002 | Boivin | ................... | B62B 17/04 |
| | | | | 180/190 |
| 9,803,715 B1 * | 10/2017 | Simmons | ................... | F16F 9/56 |
| 2001/0038188 A1 * | 11/2001 | Fabris | ................... | B60G 9/003 |
| | | | | 280/124.11 |
| 2013/0285339 A1 * | 10/2013 | Bedard | ................ | B62D 55/108 |
| | | | | 280/28.5 |
| 2020/0016950 A1 * | 1/2020 | Lavallee | ................ | B62M 27/02 |

* cited by examiner

US 11,084,348 B2

CLAMP, MOUNT TAB AND TETHER FOR LIMIT STRAP

CROSS REFERENCE TO RELATED APPLICATION[S]

This application claims priority to U.S. Provisional patent applications to Justin Smith entitled: "CLAMP FOR LIMIT STRAP," Ser. No. 62/636,582, filed Feb. 28, 2018; "LIMIT STRAP WITH TETHER," Ser. No. 62/702,259, filed Jul. 23, 2018; and "CLAMP AND MOUNT TAB FOR LIMIT STRAP," Ser. No. 62/718,983, filed Aug. 16, 2018, the disclosures of which are hereby incorporated entirely herein by reference.

BACKGROUND OF THE INVENTION

Technical Field

This invention relates generally to a limit strap for use with a shock absorber for a vehicle and, more particularly, to means of securing and retaining a limit strap.

State of the Art

The common use of shock absorbers for vehicles provides significant advantages, including reducing the impact felt by the chassis and, therefore, the occupants of the vehicle when it travels over bumps. However, depending on the size of the bump, the vehicle may be lifted upward allowing a tire to lose contact with the road. This is particularly common with vehicles used in off-road racing, for example. When the vehicle is in such a lifted position, the weight of the wheel assembly may cause the shock absorber to fully extend, resulting in damage to the shock absorber. Further, when a shock absorber is in a fully-extended position, other vehicle suspension parts, including brake lines and half shafts, may also suffer damage by over-extension.

A common device in use today is a limit strap which consists of a flexible member having one end attached to the frame of the vehicle near the top end of the shock absorber and the other end attached to the lower control arm near the bottom end of the shock absorber. The length of the limit strap is such that it prevents the shock absorber from fully extending, thus preventing damage to the shock absorber and other vehicle suspension parts.

Many vehicles are manufactured without limit straps. Limit straps may be added later to those vehicles as aftermarket parts. Conventional means of attaching limit straps to the vehicle frame include bolting the strap to the vehicle frame or modifying the vehicle frame to receive a limit strap retention device. However, those attachment devices and methods commonly result in failure of the attachment devices used or require significant labor and modification of the vehicle frame to allow for attachment of a limit strap to the vehicle frame.

In addition, compression of the springs of the shock absorber often results in the middle portion of the limit strap bowing out from the shock absorber and catching or snagging on other components of the vehicle, resulting in damage to the vehicle or the limit strap.

Accordingly, there is a need in the field of limit straps for an improved means of securing and retaining a limit strap.

SUMMARY OF EMBODIMENTS

The present invention relates generally to a limit strap for use with a shock absorber for a vehicle and, more particularly, to means of securing and retaining a limit strap.

Limit Strap Clamp and Mounting Tab

Disclosed is a two-piece limit strap clamp for use with a shock absorber, wherein the two-piece limit strap clamp generally comprises a first clamp member and a second clamp member removably coupled together. The first and second clamp members coupled together form a limit strap clamp having an aperture of a size and shape to engage a shock absorber. The second clamp member is adapted for removable attachment to a limit strap retention device.

Embodiments include a two-piece limit strap clamp for use with a shock absorber. The two-piece limit strap clamp comprises a first clamp member and a second clamp member removably coupled to the first clamp member. The first clamp member and the second clamp member comprise inner surfaces that correspond to each other when coupled together. The two-piece limit strap clamp comprises an aperture formed when the first clamp member and the second clamp member are coupled together, wherein the first and second clamp members are coupled around a shock absorber, wherein the shock absorber extends through the aperture and engages the inner surfaces of the first and second clamp members. The second clamp member is adapted for removable attachment to a limit strap retention device.

Embodiments may include a lower mounting tab, coupled to the shock mount of the lower control arm of the vehicle, for attaching the lower end of the limit strap. The tab may extend toward an upper end of the shock absorber. The tab lifts the attachment point of the limit strap to the control arm and places the limit strap in a location that clears the tire of the vehicle, thereby preventing rubbing of the tire on the limit strap that may cause damage to the vehicle components and/or to the limit strap.

Limit Strap with Tether

Disclosed is a limit strap with a tether, wherein the tether is releasably coupled to a spring of a shock absorber.

Embodiments include a limit strap for use with a shock absorber comprising: a flexible member having an upper end and a lower end, wherein the upper end and the lower end are coupled to a vehicle adjacent a shock absorber to limit extension travel of the shock absorber; and a tether coupled to the flexible member between the upper end and the lower end of the flexible member at a predetermined distance from the upper end and the lower end, wherein the tether is releasably coupled to a spring of the shock absorber to maintain a portion of the flexible member adjacent the shock absorber during compression of the shock absorber.

Also disclosed is a method of use of a limit strap with a tether comprising: coupling the upper end of a flexible member of a limit strap to the frame of a vehicle or to another vehicle part at a location near the top end of a shock absorber of the vehicle; coupling the lower end of the flexible member of the limit strap to a lower control arm of the vehicle or to another vehicle part at a location near the bottom end of the shock absorber, wherein the flexible member of the limit strap limits the extension travel of the shock absorber; and removably coupling a tether of the limit strap to a coil of a spring of the shock absorber, wherein the tether maintains a portion of the flexible member adjacent the shock absorber during compression of the shock absorber.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

Figure 1:
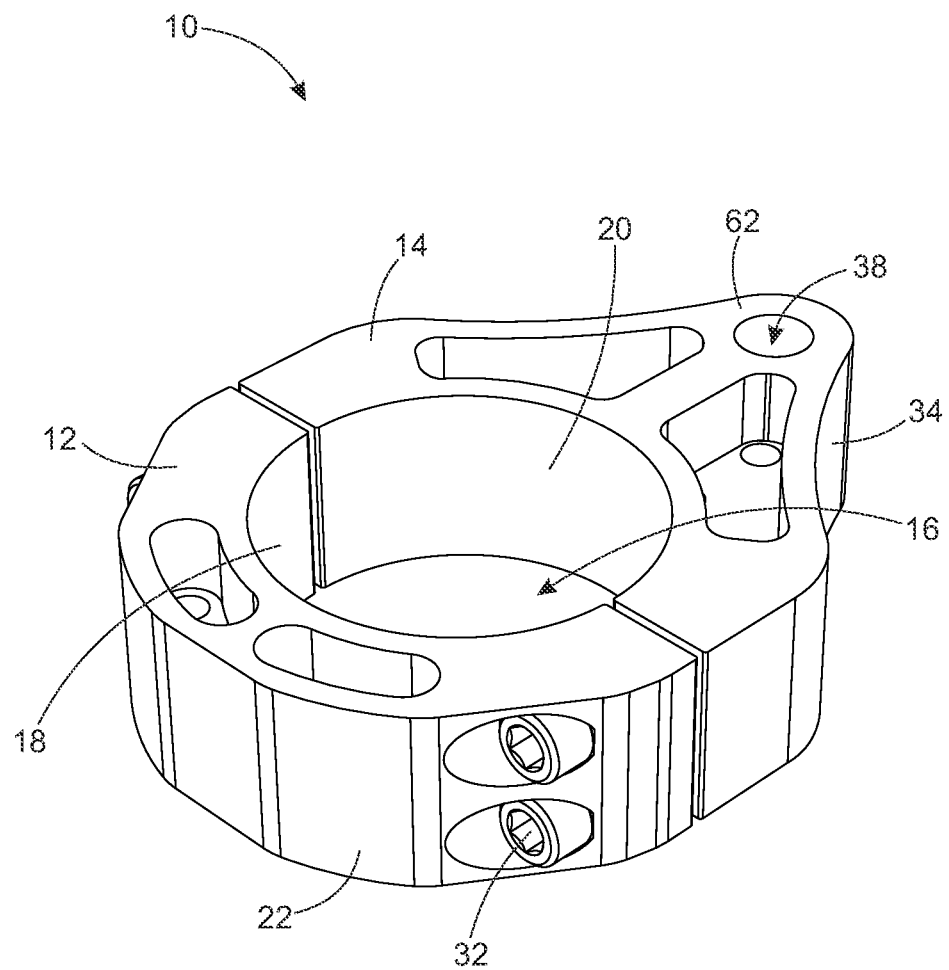
FIG. 1 is a perspective view of a limit strap clamp for use with a shock absorber and a limit strap retention device.

The present invention relates generally to a limit strap for use with a shock absorber for a vehicle and, more particularly, to means of securing and retaining a limit strap.

Limit Strap Clamp and Mounting Tab

As discussed above, embodiments of the present invention relate to a two-piece limit strap clamp for use with a shock absorber, wherein the two-piece limit strap clamp generally comprises a first clamp member and a second clamp member removably coupled together. The first and second clamp members coupled together form a limit strap clamp having an aperture of a size and shape to engage a shock absorber. The second clamp member is adapted for removable attachment to a limit strap retention device.

Referring to the drawings, FIGS. 1-5 depict a limit strap clamp 10 in accordance with embodiments. The clamp 10 may be a two piece clamp that comprises a first clamp member 12 and a second clamp member 14. The first clamp member 12 is removably coupled to the second clamp member 14. When coupled together, the first clamp member 12 and the second clamp member 14 form an aperture 16. The first clamp member 12 and the second clamp member 14 each comprise an inner surface 18 and an inner surface 20 respectively, wherein the first and second clamp members 12 and 14 are coupled around a shock absorber 26, wherein the shock absorber 26 extends through the aperture 16 and engages the inner surfaces 18 and 20 of the first and second clamp members 12 and 14.

Figure 2:
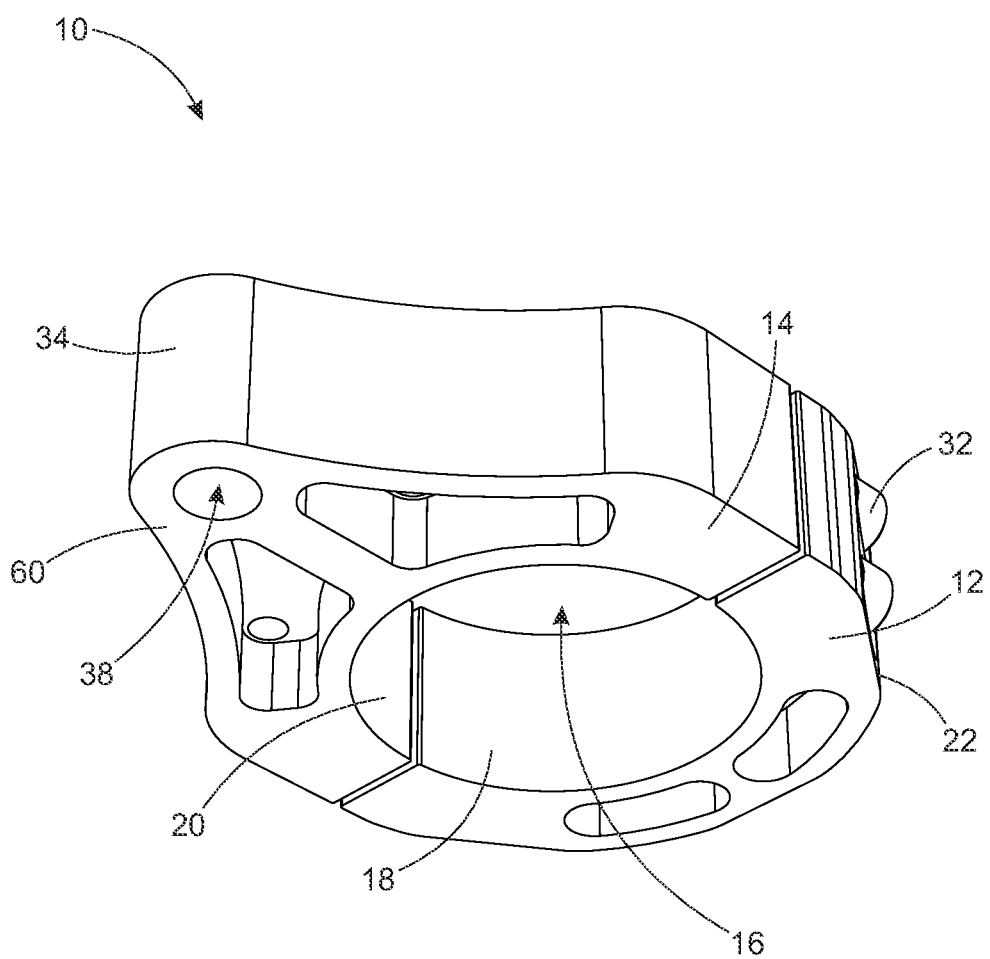
FIG. 2 is another perspective view of a limit strap clamp for use with a shock absorber and a limit strap retention device, according to an embodiment.
Figure 3:
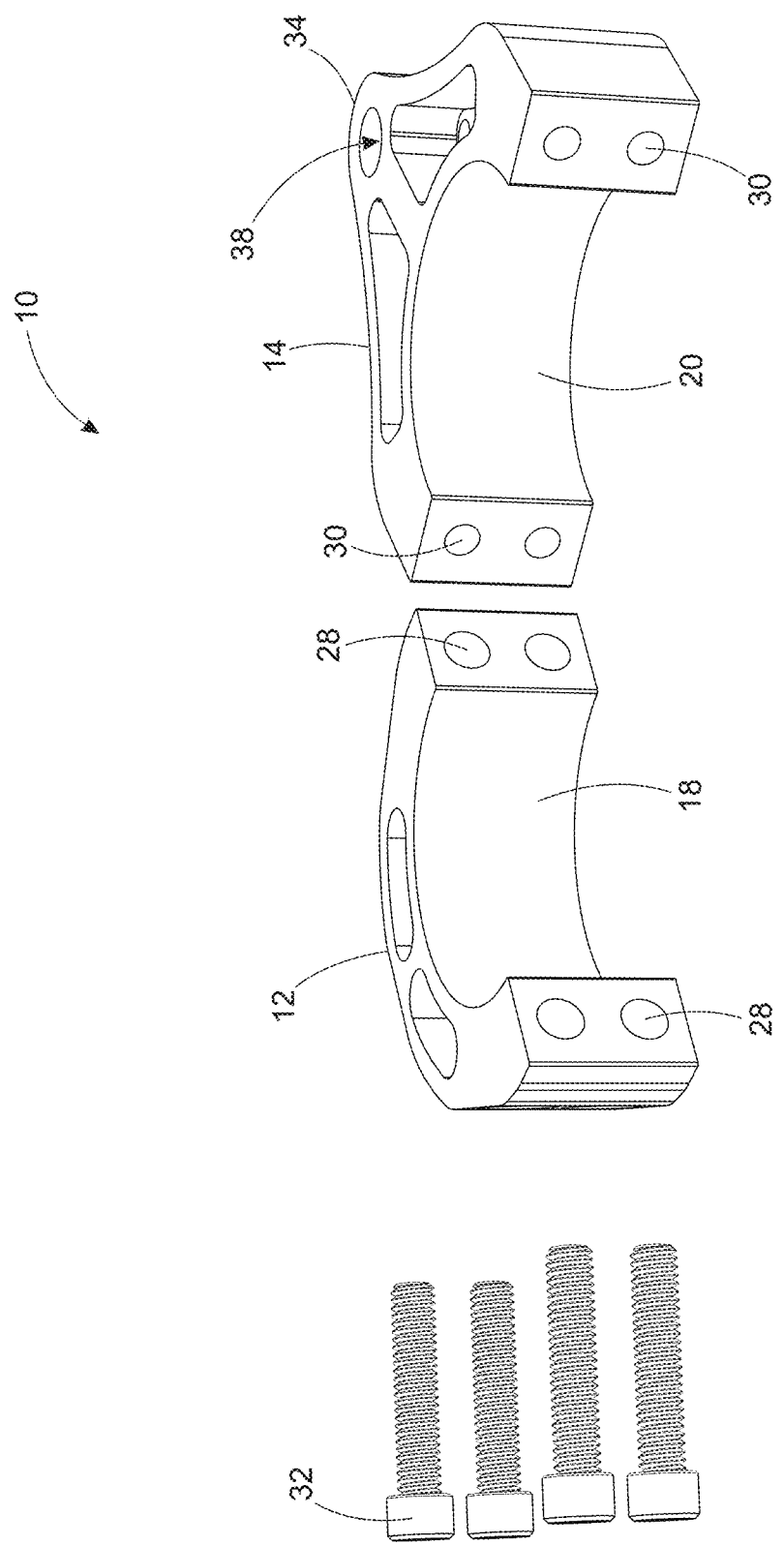
FIG. 3 is an exploded view of a limit strap clamp for use with a shock absorber and a limit strap retention device, according to an embodiment.

In an embodiment, as shown in FIGS. 1-3, the first clamp member 12 includes apertures 28 that correspond to apertures 30 of the second clamp member 14. Connectors 32 engage each of the apertures 28 and the apertures 30 to removably couple the first clamp member 12 to the second clamp member 14. In some embodiments, the connectors 32 may be bolts.

In an embodiment, as shown in FIGS. 1-5, the second clamp member 14 comprises a protrusion 34 extending in a direction radial to a longitudinal axis 36 of the shock absorber 26. The protrusion 34 comprises an aperture 38 located at an end a predetermined distance from the aperture 16 formed when the first clamp member 12 and the second clamp member 14 are coupled together. The aperture 38 may be adapted to engage a clevis rod 40, wherein an upper shank 42 of the clevis rod 40 extends in an upward direction through the aperture 38. The clevis rod 40 may comprise threads 46 on the upper shank 42 thereof and a clevis 48 on an opposing lower end 44 thereof. The threads 46 on the upper shank 42 of the clevis rod 40 are provided to removably engage a securing device, such as, but not limited to, a first nut 50 and a second nut 52, wherein the first nut 50 and the second nut 52 are removably threaded onto the upper shank 42. The second nut 52 also engages the first nut 50 and is tightened in order to operate as a jam nut to the first nut 50 to prevent loosening of the first nut 50 while in operation. A coil spring 54 is provided having an opposing upper end 56 and lower end 58, wherein the coil spring 54 encircles the upper shank 42 of the clevis rod 40, wherein the coil spring 54 is disposed about the upper shank 42 between the clevis 48 and the protrusion 34.

Figure 4:
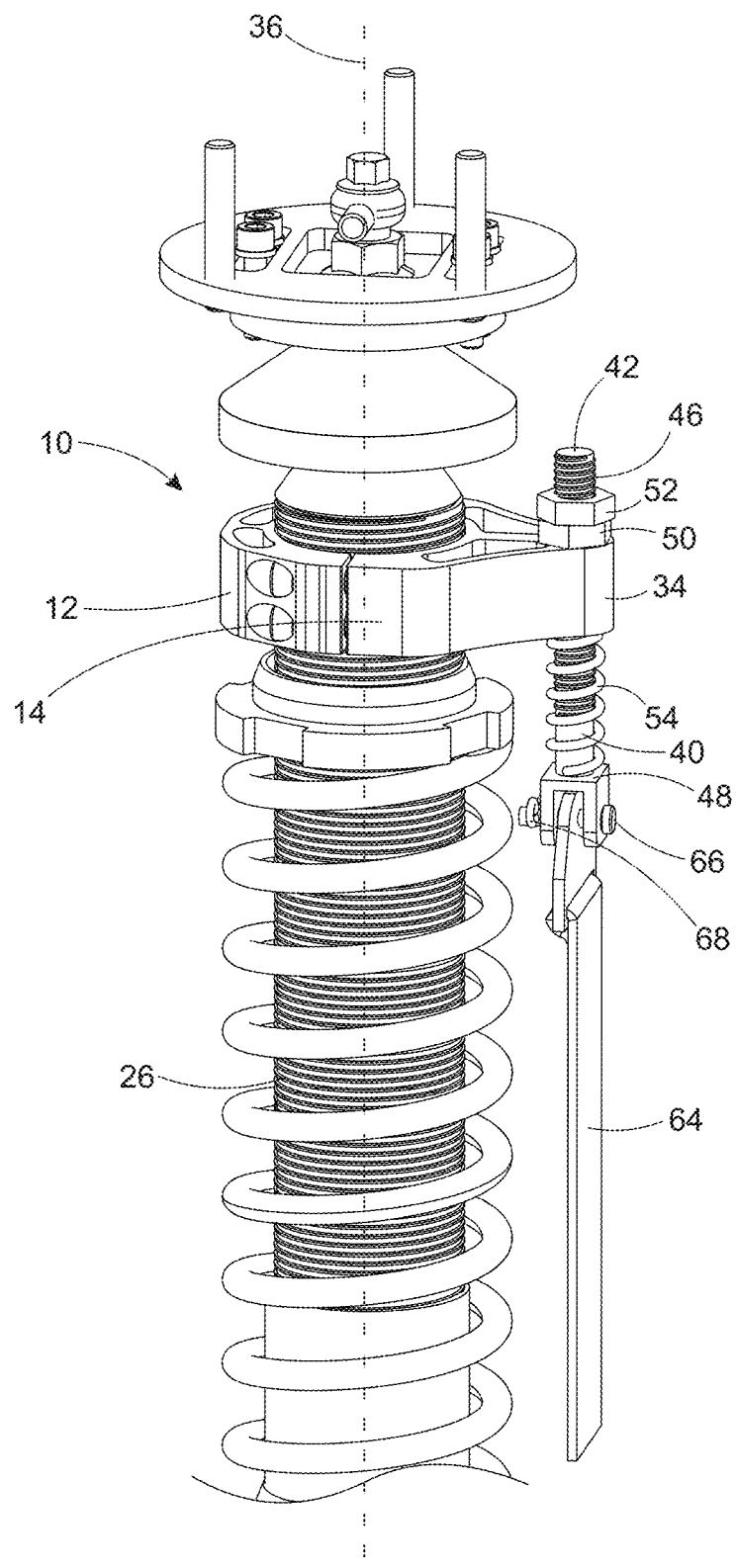
FIG. 4 is a perspective view of a limit strap clamp coupled to a shock absorber and attached to a limit strap retention device, according to an embodiment.
Figure 5:
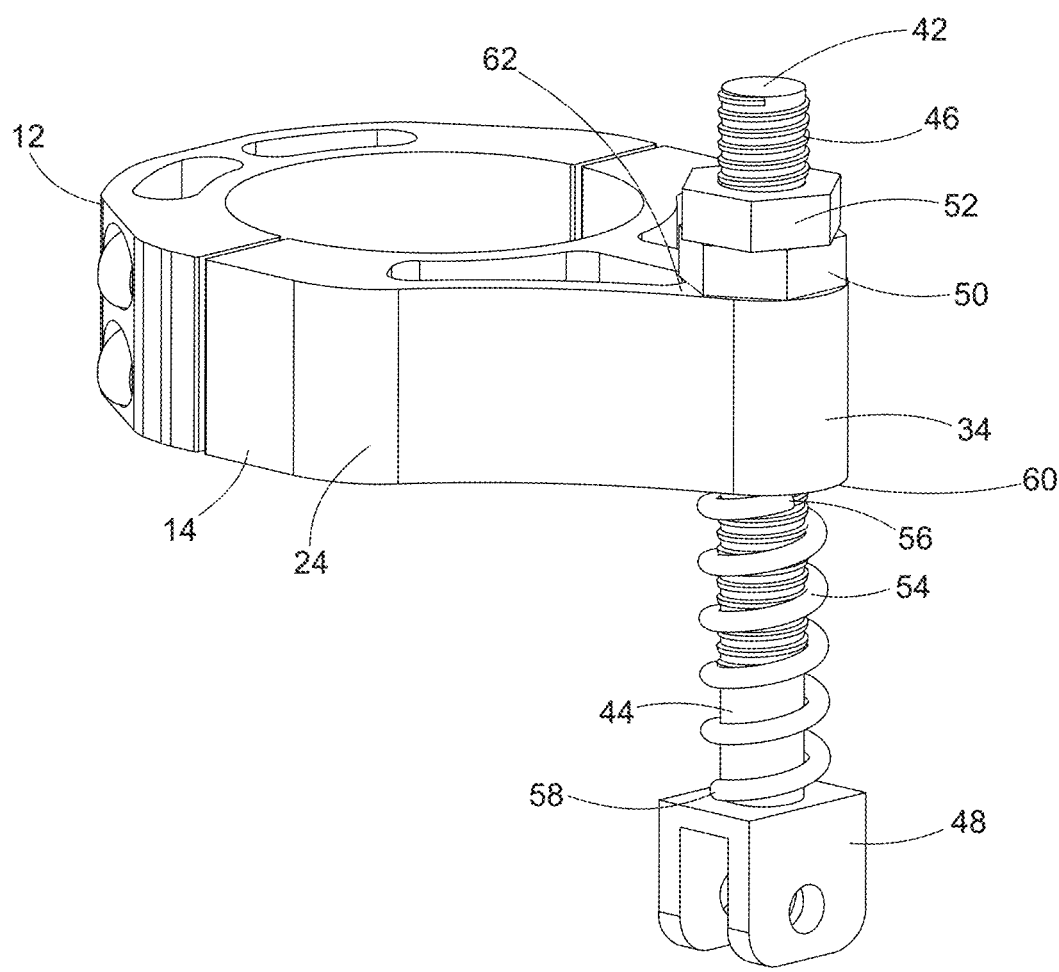
FIG. 5 is a perspective view of a limit strap clamp attached to a limit strap retention device, according to an embodiment.

In operation, as shown in FIG. 4, the lower end 58 of the coil spring 54 engages the clevis 48 and the upper end 56 of the coil spring 54 engages a lower surface 60 of the protrusion 34. In this configuration, the downward force of the coil spring 54 on the clevis 48 and the opposing upward force of the coil spring 54 on the lower surface 60 of the protrusion 34 maintains the position of the clevis rod 40 relative to the protrusion 34, whereby the first nut 50 engages an upper surface 62 of the protrusion 34, whereby the extent of the relative position of the clevis rod 40 is limited by the first nut 50. The position of the clevis rod 40 relative to the protrusion 34 may thereby be easily adjusted by first loosening the second nut 52, then loosening or tightening the first nut 50, and finally tightening the second nut 52 again. The clevis 48 is adapted for attachment to a limit strap 64. In some embodiments, the clevis 48 is attached to a limit strap 64 by use of a clevis pin 66 and a cotter pin 68.

The length of the limit strap 64 is such that it prevents the shock absorber 26 from fully extending, thus preventing damage to the shock absorber 26 and other vehicle suspension parts. The protrusion 34 of the clamp 10 allows for attachment of the limit strap 64 without interfering with the operation of the shock absorber. As discussed previously, the position of the clevis rod 40 relative to the protrusion 34 may thereby be easily adjusted by first loosening the second nut 52, then loosening or tightening the first nut 50, and finally tightening the second nut 52 again. This allows for fine tuning adjustments to the length of the limit strap device that thereby adjust the limit the shock absorber 26 may extend.

While it is shown that the clamp 10 is a two-piece clamp, other embodiments are contemplated. For example and without limitation, the clamp 10 may include a plurality of pieces, such as three or four. Further still, the clamp may be a single piece or unitary member clamp with a clamp body and the aperture 26 formed through the clamp body. The protrusion 34 extending from the second clamp member 14 may alternatively extend from any other clamp member or combination of clamp members, either as a unitary body or as a separate body coupled thereto. The clamp 10 in all configurations is coupled directly to the shock absorber by use of the aperture 26 through the clamp body.

While it is shown that the first clamp member 12 and second clamp member 14 are coupled together using bolts 32, this is not intended to be limiting. First and second clamp members 12 and 14 may be coupled together by any suitable means known by a person of ordinary skill in the art, such as by use of clasps, pins, or the like.

Additionally, in some embodiments, the shock 26 may be manufactured with the clamp 10 formed as an integral part of the shock 26, where in the shock 26 includes a protrusion 34 extending from the shock 26, wherein a clevis 48 may be coupled to the protrusion 34. In embodiments, the protrusion 34 may include an aperture 38 located at an end a predetermined distance from the shock 26, wherein the clevis 48 is coupled to the aperture 38. In this embodiment, the shock 26 is manufactured with the components to mount a limit strap 64 to a vehicle as part of the shock 26.

Figure 6:
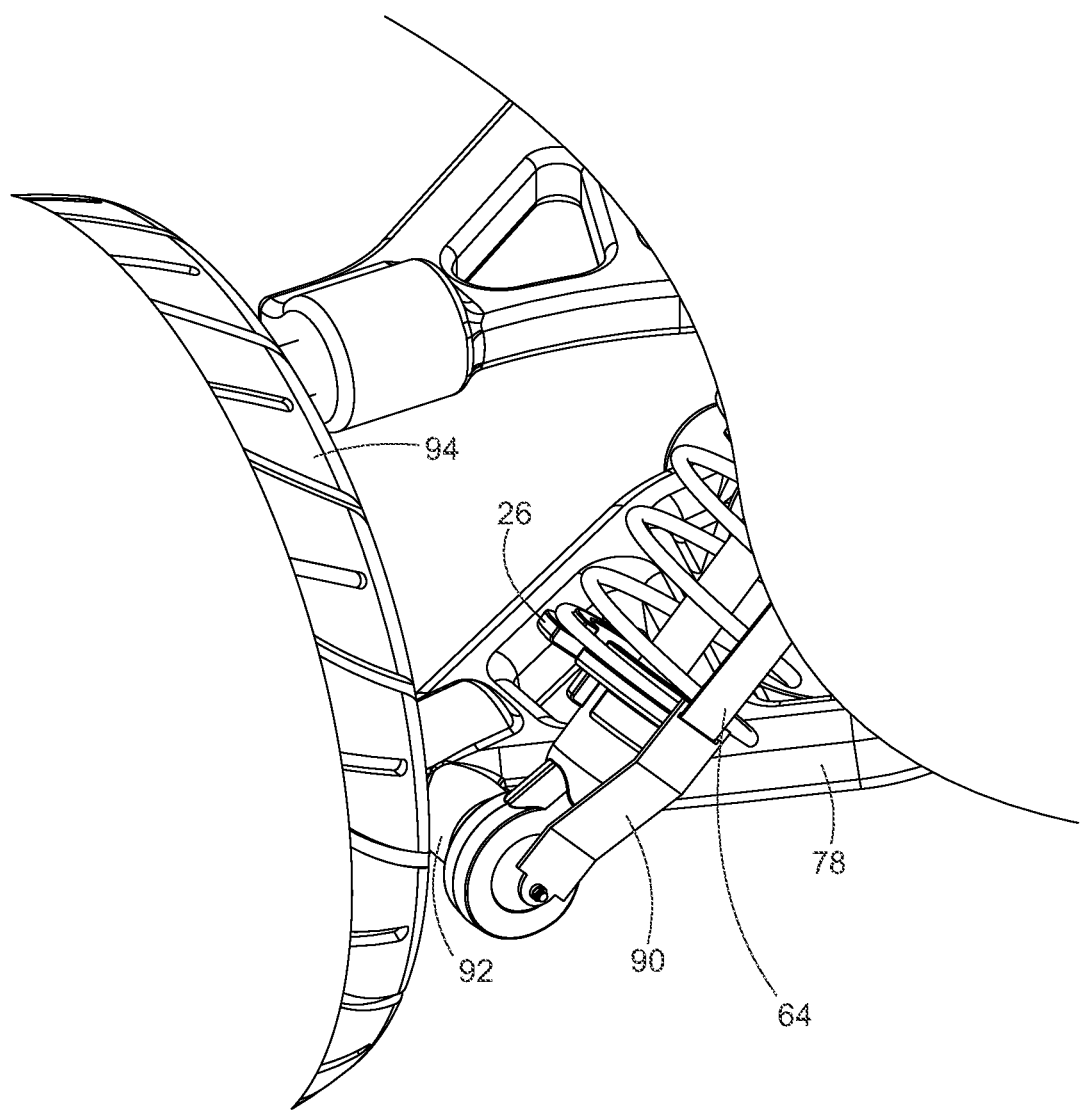
FIG. 6 is a perspective view of a lower mount tab coupled between a control arm and a limit strap, according to an embodiment.
Figure 7:
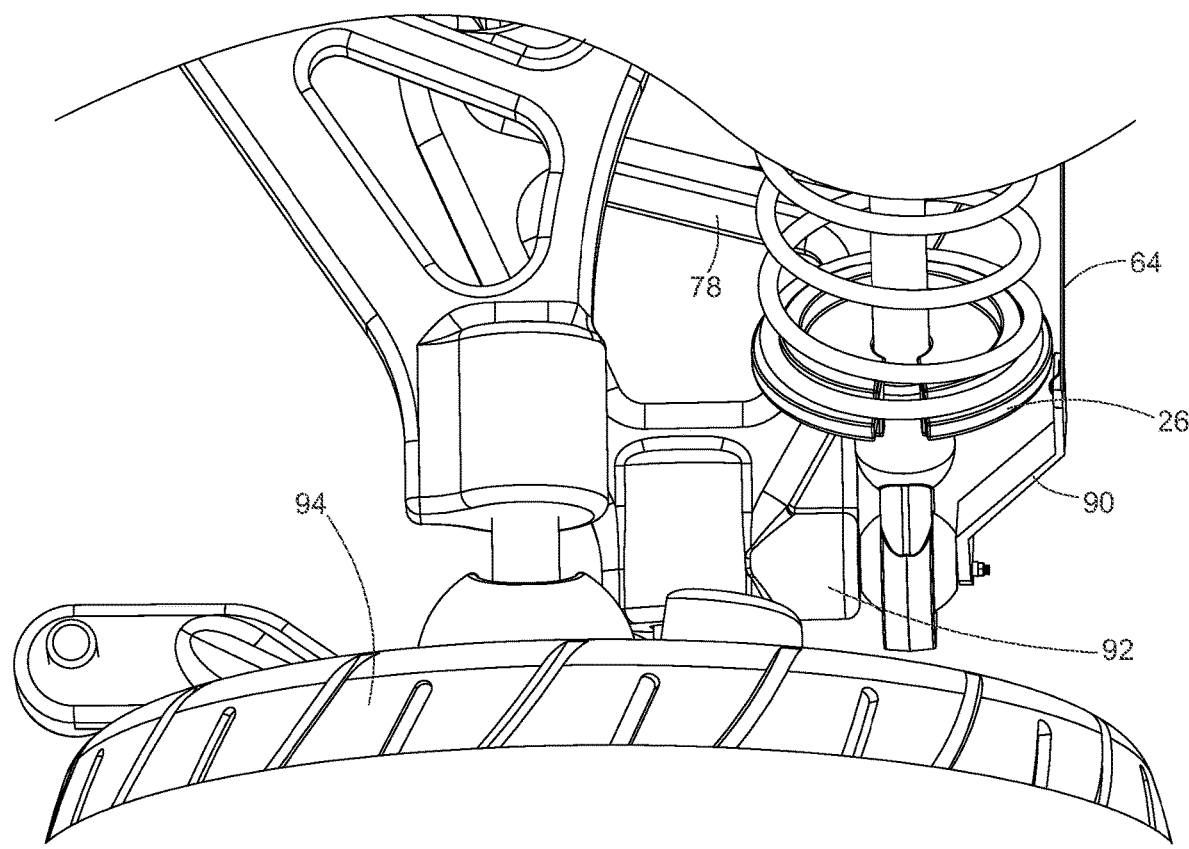
FIG. 7 is a perspective view of a lower mount tab coupled between a control arm and a limit strap, according to an embodiment.

Referring to FIGS. 6-7, a lower mounting tab 90 may be removably coupled to the shock mount 92 of control arm 78. The lower mounting tab 90 may be coupled to the shock mount 92 of the control arm 78 utilizing the same hardware used to couple the shock absorber 26 to the shock mount 92, as depicted in FIGS. 6-7. The tab 90 may extend in a direction that is toward an upper end of the shock absorber 26. In operation, a lower end of a limit strap 64 may be coupled to the lower mounting tab 90. The lower mounting tab 90 lifts the attachment point of the limit strap 64 to the control arm 78 and places the limit strap 64 in a location that clears the tire 94, thereby preventing rubbing of the tire 94 on the limit strap 64 that may cause damage to the vehicle components and/or to the limit strap 64.

Limit Strap with Tether

Figure 8:
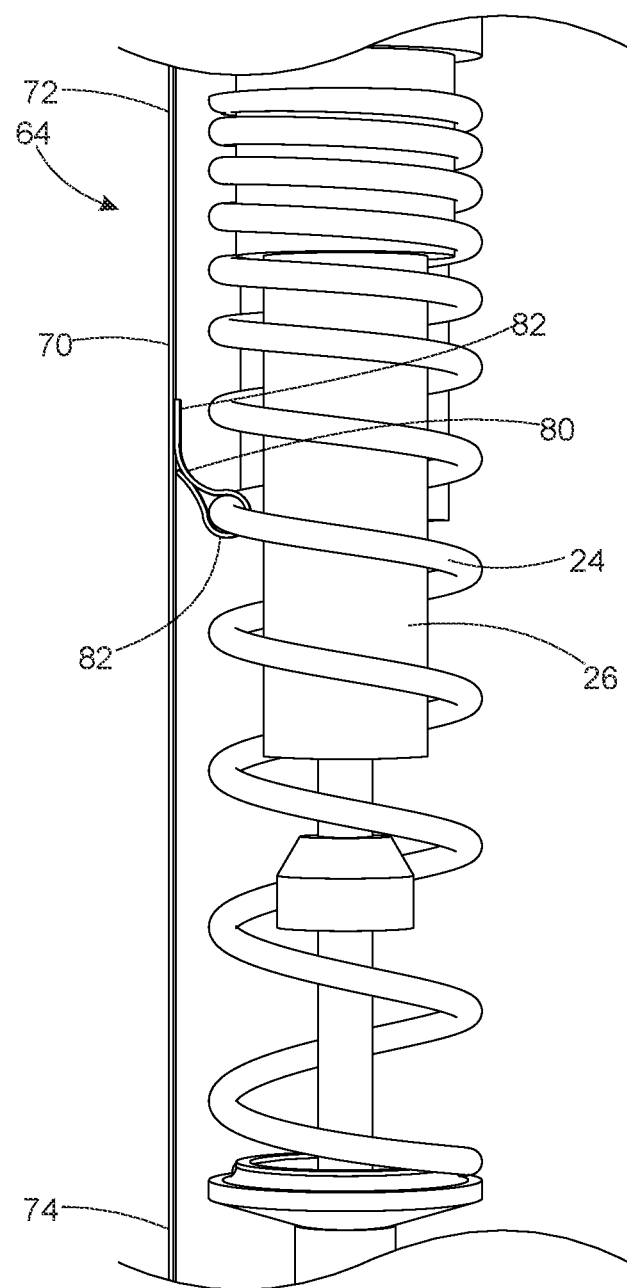
FIG. 8 is a perspective view of a limit strap with a tether coupled to a shock absorber with the limit strap extended with the shock absorber extended, in accordance with embodiments.
Figure 9:
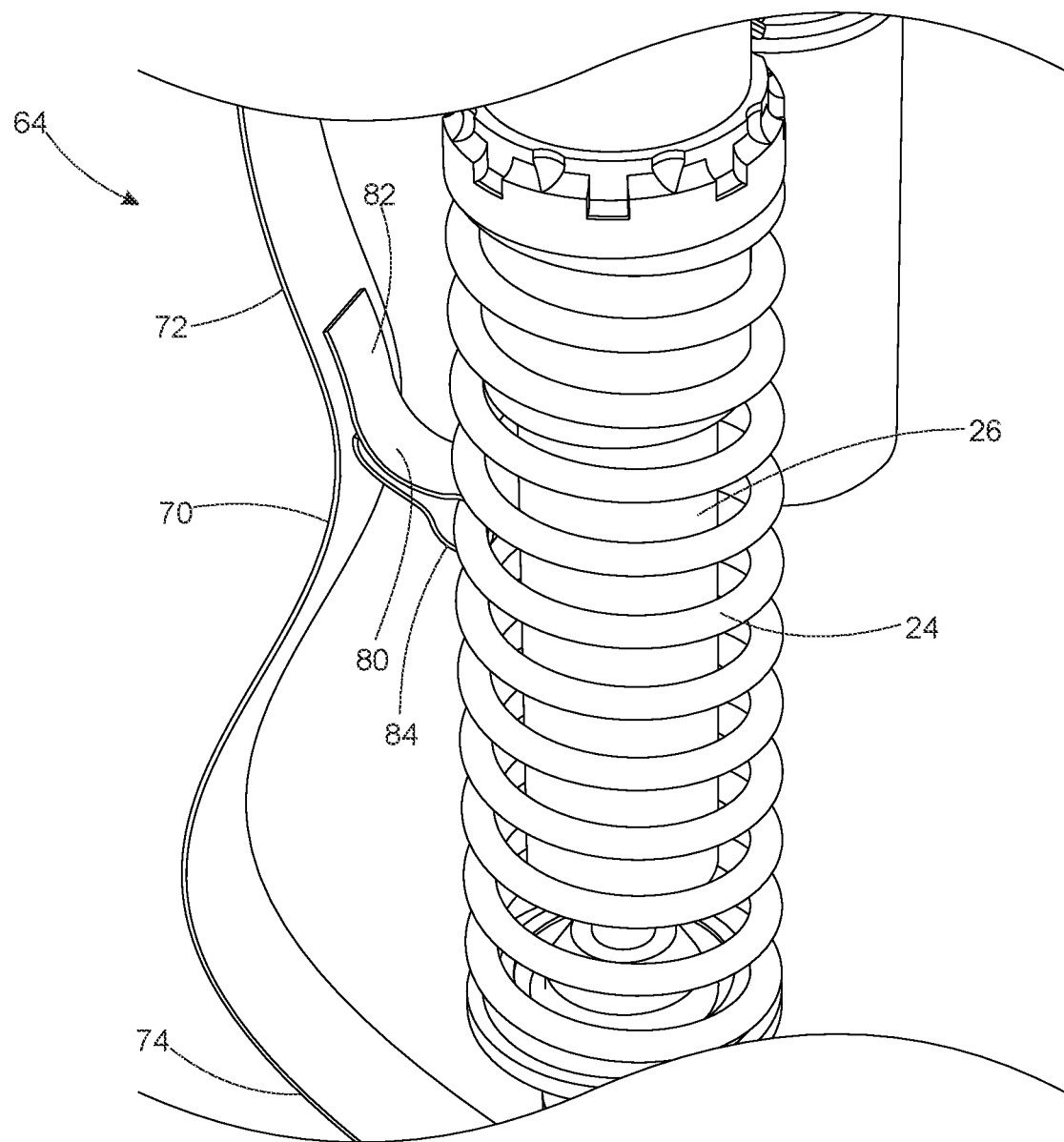
FIG. 9 is a perspective view of a limit strap with a tether coupled to a shock absorber with the limit strap retained with the shock absorber compressed, in accordance with embodiments.

Referring to the drawings, FIGS. 8-9 depict a limit strap 64 in accordance with embodiments. The limit strap 64 consists of a flexible member 70 with an upper end 72 and an opposing lower end 74. The upper end 72 is removably attached to the vehicle frame or another location near the top end of the shock absorber 26. The lower end 74 is removably attached to the lower control arm or another location near the bottom end of the shock absorber 26. The length of the flexible member 70 is such that it prevents the shock absorber 26 from fully extending, thus preventing damage to the shock absorber 26 and other vehicle suspension parts during operation of the vehicle that may result in full extension of the shock absorber 26. The limit strap 64 further includes a tether 80. The tether 80 consists of a second flexible member 86 with a first end 82 and an opposing second end 84. The first end 82 of the tether 80 is coupled to the flexible member 70 and the second end 84 of the tether 80 is releasably attached to a spring 24 of the shock absorber 26.

FIG. 8 shows a limit strap 64 in operation, in a fully extended position, while the tether 80 is coupled to the spring 24, operating to limit the travel of the shock absorber 26 when extending, such as during a jump of the vehicle. The limit strap 64 operates to prevent damage to the shock absorber 26 that can occur if the shock absorber 26 extends fully and then compresses upon landing of a jump of the vehicle.

In order to avoid other possible damage to the vehicle or to the limit strap 64, the tether 80 of the limit strap 64 is coupled to the spring 24 of the shock absorber 26. As the shock absorber 26 is compressed, as shown in FIG. 9, the tether 80 keeps the flexible member 70 from bowing out and keeps a middle portion of the flexible member 70 adjacent the shock absorber 26, thereby limiting the possibility of damaging other components of the vehicle or damaging the limit strap 64. Further, in embodiments, the tether 80 may be located near a center of the flexible member 70 defined as approximately midway between the upper end 72 and the lower end 74 of the limit strap 64. It will be understood that the first end 82 of the tether 80 may be coupled to the flexible member 70 between the upper end 72 and the lower end 74 within a predetermined range of distances from each end 72 and 74. Alternatively, it will be understood that the first end 82 of the tether 80 may be coupled to the flexible member 70 between the upper end 72 and the lower end 74 within a predetermined range of distances from the midpoint of the flexible member 70 of the limit strap 64. For example, the predetermined range of distances from the midpoint of the flexible member 70 of the limit strap 64 to the location where the first end 82 of the tether 80 is coupled to the flexible member 70 may be from 0 to about 8 inches.

In some embodiments, the first end 82 of the tether 80 may be releasably coupled to the flexible member 70 at a location between the upper end 72 and the lower end 74 of the flexible member 70. In such embodiments, the first end 82 of the tether 80 may be released from the flexible member 70 and then releasably recoupled to the flexible member 70 at a different location on the flexible member 70 between the upper end 72 and the lower end 74 of the flexible member 70.

In embodiments, the tether 80 may be adjustable in length in order to allow for proper function of the shock absorber 26. Further, the second end 84 of the tether 80 may be attached to the spring 24 of the shock absorber 26 by any of a clasp, a clip, a hook-and-loop fastener, a loop over buckle, a slide release buckle and the like.

Figure 10:
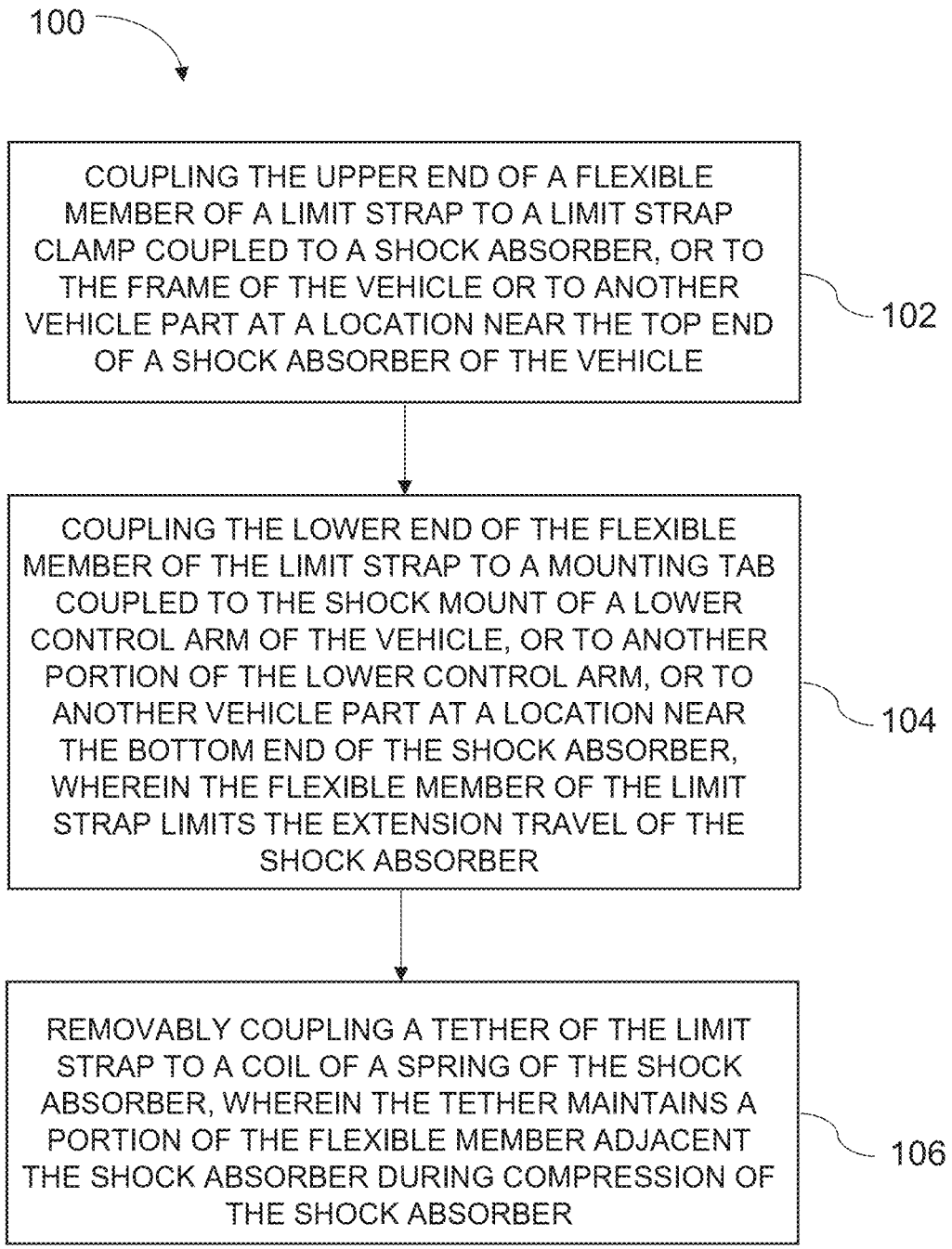
FIG. 10 depicts a method of use of a limit strap with a tether.

FIG. 10 illustrates a flow chart of a method of use 100 of a limit strap with a tether according to an embodiment. The method of use 100 includes coupling the upper end of a flexible member of a limit strap to a limit strap clamp coupled to a shock absorber, or to the frame of the vehicle or to another vehicle part at a location near the top end of a shock absorber of the vehicle (Step 102); coupling the lower end of the flexible member of the limit strap to a mounting tab coupled to the shock mount of a lower control arm of the vehicle, or to another portion of the lower control arm, or to another vehicle part at a location near the bottom end of the shock absorber, wherein the flexible member of the limit strap limits the extension travel of the shock absorber (Step 104); and removably coupling a tether of the limit strap to a coil of a spring of the shock absorber, wherein the tether maintains a portion of the flexible member adjacent the shock absorber during compression of the shock absorber (Step 106).

The method of use 100 may further comprise releasing the first end of the tether from the flexible member at a first location on the flexible member between the upper and lower ends of the flexible member; and recoupling the first end of the tether releasably to the flexible member at a second location on the flexible member between the upper and lower ends of the flexible member, wherein the first end of the tether is releasably coupled to the flexible member between the upper and lower ends of the flexible member at an adjustable distance from one of the upper end or the lower end.

The method of use 100 may further comprise adjusting the length of the tether, wherein the tether is adjustable in length.

The components defining any limit strap clamp, mounting tab, or any limit strap with a tether may be formed of any of many different types of materials or combinations thereof that can readily be formed into shaped objects provided that the components selected are consistent with the intended operation of a limit strap clamp, mounting tab, or any limit strap with a tether. For example, the components may be formed of: rubbers (synthetic and/or natural) and/or other like materials; glasses (such as fiberglass) carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as zinc, magnesium, titanium, copper, iron, steel, carbon steel, alloy steel, tool steel, stainless steel, aluminum, any combination thereof, and/or other like materials; alloys, such as aluminum alloy, titanium alloy, magnesium alloy, copper alloy, any combination thereof, and/or other like materials; any other suitable material; and/or any combination thereof.

Furthermore, the components defining any limit strap clamp, mounting tab, or any limit strap with a tether may be purchased pre-manufactured or manufactured separately and then assembled together. However, any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components. Other possible steps might include sand blasting, polishing, powder coating, zinc plating, anodizing, hard anodizing, and/or painting the components for example.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A limit strap for use with a shock absorber comprising:
   a flexible member having an upper end and a lower end, wherein the upper and lower ends are coupled to a vehicle adjacent a shock absorber to limit extension travel of the shock absorber; and
   a tether having a first end and a second end, wherein the first end is coupled to the flexible member between the upper and lower ends of the flexible member, wherein the second end of the tether is coupled to a spring of the shock absorber to maintain a portion of the flexible member adjacent the shock absorber during compression of the shock absorber.

2. The limit strap of claim 1, wherein the first end of the tether is coupled to the flexible member between the upper and lower ends of the flexible member at a predetermined distance from one of the upper or lower ends.

3. The limit strap of claim 1, wherein the first end of the tether is coupled to the flexible member between the upper and lower ends of the flexible member at an adjustable distance from one of the upper or lower ends.

4. The limit strap of claim 1, wherein the tether is adjustable in length.

5. A method of use of a limit strap with a tether for use with a shock absorber comprising:
   coupling an upper end of a flexible member of a limit strap to a limit strap clamp coupled to a shock absorber, or to a frame of a vehicle or to another vehicle part at a location near a top end of a the shock absorber of the vehicle;
   coupling a lower end of the flexible member of the limit strap to a mounting tab coupled to a shock mount of a lower control arm of the vehicle, or to another portion of the lower control arm, or to another vehicle part at a location near a bottom end of the shock absorber, wherein the flexible member of the limit strap limits the extension travel of the shock absorber; and
   removably coupling a tether of the limit strap to a coil of a spring of the shock absorber, wherein the tether maintains a portion of the flexible member adjacent the shock absorber during compression of the shock absorber.

6. The method of use of claim 5, wherein the first end of the tether is releasably coupled to the flexible member between the upper end and the lower end of the flexible member at an adjustable distance from one of the upper end or the lower end, further comprising:
   releasing the first end of the tether from the flexible member at a first location on the flexible member between the upper and lower ends of the flexible member; and
   recoupling the first end of the tether releasably to the flexible member at a second location on the flexible member between the upper and lower ends of the flexible member.

7. The method of use of claim 5, wherein the tether is adjustable in length, further comprising:
   adjusting the length of the tether.

* * * * *